US012578130B2

(12) United States Patent
Hasegawa et al.

(10) Patent No.: US 12,578,130 B2
(45) Date of Patent: Mar. 17, 2026

---

(54) TURBO CHILLER

(71) Applicant: MITSUBISHI HEAVY INDUSTRIES THERMAL SYSTEMS, LTD., Tokyo (JP)

(72) Inventors: Yasushi Hasegawa, Tokyo (JP); Kenji Ueda, Tokyo (JP); Noriyuki Matsukura, Tokyo (JP); Ryosuke Suemitsu, Tokyo (JP); Shintaro Omura, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 601 days.

(21) Appl. No.: 17/523,239

(22) Filed: Nov. 10, 2021

(65) Prior Publication Data

US 2022/0136744 A1 May 5, 2022

Related U.S. Application Data

(63) Continuation of application No. 15/322,014, filed as application No. PCT/JP2015/071296 on Jul. 27, 2015, now abandoned.

(30) Foreign Application Priority Data

Jul. 31, 2014 (JP) ................................. 2014-156370

(51) Int. Cl.
    *F25B 31/00* (2006.01)
    *F04D 17/10* (2006.01)
    (Continued)

(52) U.S. Cl.
    CPC ............ *F25B 31/002* (2013.01); *F04D 17/10* (2013.01); *F04D 25/02* (2013.01); *F04D 29/053* (2013.01);
    (Continued)

(58) Field of Classification Search
    CPC .... F25B 31/002; F25B 31/006; F25B 31/008; F25B 31/026; F25B 1/053; F04D 17/10;
    (Continued)

(56) References Cited

U.S. PATENT DOCUMENTS

| | | | | | |
|---|---|---|---|---|---|
| 3,866,438 | A | * | 2/1975 | Endress | ................ F25B 31/008 |
| | | | | | 62/505 |
| 4,396,848 | A | | 8/1983 | Scheldorf et al. | |

(Continued)

FOREIGN PATENT DOCUMENTS

| | | |
|---|---|---|
| CN | 1181490 A | 5/1998 |
| CN | 103441614 A | 12/2013 |

(Continued)

OTHER PUBLICATIONS

Editors of the American Heritage Dictionaries (Ed.). (2016). Step. In The American Heritage(R) Dictionary of the English Language (6th ed.). Houghton Mifflin. https://search.credoreference.com/articles/Qm9va0FydGljbGU6NDQ5MjM3Nw==?aid=279753.*

(Continued)

*Primary Examiner* — Tavia Sullens
(74) *Attorney, Agent, or Firm* — Birch, Stewart, Kolasch & Birch, LLP

(57) ABSTRACT

A turbo chiller that has an oil-free configuration, which reduces the frequency of maintenance and maintenance-induced release of refrigerant, and can achieve a reduced environmental impact by utilizing the characteristics of the low-pressure refrigerant R1233zd(E) that reaches negative pressure at a saturation temperature of 18° C. or lower. The turbo chiller comprises a refrigeration cycle that includes a turbo compressor, a condenser, a decompression device, and an evaporator connected in sequence via piping and is filled with a refrigerant; wherein the refrigerant is a low-pressure refrigerant R1233zd(E) refrigerant with low global warming (Continued)

potential and low ozone depletion potential; the turbo compressor has a direct drive configuration in which a rotating shaft of impellers is directly joined to a motor; and the rotating shaft is supported by magnetic bearings.

8 Claims, 5 Drawing Sheets

(51) Int. Cl.

| | |
|---|---|
| *F04D 25/02* | (2006.01) |
| *F04D 29/053* | (2006.01) |
| *F04D 29/063* | (2006.01) |
| *F04D 29/28* | (2006.01) |
| *F04D 29/58* | (2006.01) |
| *F16C 37/00* | (2006.01) |
| *F25B 1/053* | (2006.01) |
| *F25B 31/02* | (2006.01) |

(52) U.S. Cl.

CPC ......... *F04D 29/063* (2013.01); *F04D 29/284* (2013.01); *F04D 29/582* (2013.01); *F25B 1/053* (2013.01); *F25B 31/006* (2013.01); *F25B 31/008* (2013.01); *F25B 31/026* (2013.01); *F16C 37/005* (2013.01)

(58) Field of Classification Search

CPC ...... F04D 25/02; F04D 29/053; F04D 29/058; F04D 29/063; F04D 29/284; F04D 29/582; F16C 37/005

See application file for complete search history.

(56) References Cited

U.S. PATENT DOCUMENTS

| | | | | |
|---|---|---|---|---|
| 4,573,324 | A | * | 3/1986 | Tischer ................... F25B 1/047 |
| | | | | 62/505 |
| 5,624,244 | A | | 4/1997 | Moon |
| 5,881,564 | A | | 3/1999 | Kishimoto et al. |
| 5,924,847 | A | | 7/1999 | Scaringe |
| 6,065,297 | A | | 5/2000 | Tischer |
| 6,176,092 | B1 | | 1/2001 | Butterworth |
| 8,516,850 | B2 | | 8/2013 | Jadric et al. |
| 2005/0248221 | A1 | * | 11/2005 | Bosen ................... F16C 37/005 |
| | | | | 310/58 |
| 2008/0199326 | A1 | | 8/2008 | Masoudipour et al. |
| 2008/0245082 | A1 | * | 10/2008 | Sishtla ................. F04D 29/058 |
| | | | | 62/468 |

| | | | | |
|---|---|---|---|---|
| 2011/0041529 | A1 | | 2/2011 | Chen et al. |
| 2011/0150628 | A1 | * | 6/2011 | Wagner ................. F16C 37/005 |
| | | | | 415/170.1 |
| 2013/0156544 | A1 | | 6/2013 | Sishtla |
| 2013/0174552 | A1 | | 7/2013 | Mahmoud |
| 2014/0048739 | A1 | | 2/2014 | Rached et al. |
| 2014/0165626 | A1 | | 6/2014 | Van Horn et al. |
| 2014/0174110 | A1 | | 6/2014 | Van Horn et al. |
| 2014/0260376 | A1 | | 9/2014 | Kopko et al. |
| 2016/0003510 | A1 | * | 1/2016 | De Larminat .......... F25B 43/02 |
| | | | | 62/470 |
| 2016/0009973 | A1 | | 1/2016 | Rached et al. |
| 2017/0145275 | A1 | | 5/2017 | Rached et al. |
| 2017/0146271 | A1 | | 5/2017 | Hasegawa et al. |

FOREIGN PATENT DOCUMENTS

| | | | |
|---|---|---|---|
| EP | 1 119 731 | B1 | 3/2003 |
| JP | 6-117710 | A | 4/1994 |
| JP | 11-13695 | A | 1/1999 |
| JP | 2001-95205 | A | 4/2001 |
| JP | 2001-292554 | A | 10/2001 |
| JP | 2002-188584 | A | 7/2002 |
| JP | 2002-317777 | A | 10/2002 |
| JP | 3625802 | B2 | 3/2005 |
| JP | 2009-270797 | A | 11/2009 |
| JP | 2013-122331 | A | 6/2013 |
| JP | 2014-119083 | A | 6/2014 |
| JP | 2016-33348 | A | 3/2016 |
| WO | WO 2009/114820 | A2 | 9/2009 |
| WO | WO 2010/077898 | A2 | 7/2010 |
| WO | WO 2013/119483 | A1 | 8/2013 |

OTHER PUBLICATIONS

Office Action issued Dec. 10, 2019 in related Japanese Patent Application No. 2019-000792 with an English Translation.

Office Action issued February 12, 2020 in related Japanese Patent Application No. 2019-029175 with an English Translation Office Action issued Mar. 6, 2018 in related Japanese Application No. 2014-156370 with an English Translation.

Office Action issued May 24, 2018 for Chinese Patent Application No. 201580034336.2 with an English Translation.

Office Action issued Nov. 6, 2018 in related Japanese Patent Application No. 2014-156370.

English Translation of Yuji JP 2012167699 (Year: 2018).

German Office Action for German Application No. 112015003519. 2, dated Nov. 29, 2021, with an English translation.

* cited by examiner

FIG. 5

TURBO CHILLER

This application is a Continuation of copending application Ser. No. 15/322,014, filed on Dec. 23, 2016, which is the National Phase under 35 U.S.C. § 371 of International Application No. PCT/JP2015/071296, filed on Jul. 27, 2015, which claims the benefit under 35 U.S.C. § 119(a) to Patent Application No. 2014-156370, filed in Japan on Jul. 31, 2014, all of which are hereby expressly incorporated by reference into the present application.

TECHNICAL FIELD

The present invention relates to a turbo chiller with a reduced environment impact that uses an R1233zd(E) refrigerant with a low global warming potential (GWP) and a low ozone depletion potential (ODP).

BACKGROUND ART

Currently, hydrofluorocarbon (HFC) refrigerants such as R134a are used in turbo chillers. HFC refrigerants, while having an ozone depletion potential (ODP) of 0, have a high global warming potential (GWP). Turbo chillers require routine maintenance in which bearings, lubricating oil, an oil filter, and the like are replaced. While maintenance is performed after recovering the refrigerant from the refrigeration cycle, unrecoverable refrigerant may remain inside the chiller, and refrigerant may be contained in the lubricating oil. As a result, some refrigerant may be released into the atmosphere. While this is not in violation of regulations, it is undesirable from the perspective of global warming.

Some conventional turbo chillers have an oil-free configuration, which eliminates the need for a lubrication system; as well as having a high rotation compressor, which delivers a high compression ratio and increases the suction volume; increased motor rotational speed, which enables more compact motors and reduces bearing losses; and simplified constituent elements, which improves reliability and reduces cost; all as a result of a direct drive motor configuration in which the rotating shaft of the impeller is directly joined to the motor, with the rotating shaft being supported by magnetic bearings (see, for example, Patent Documents 1 and 2). However, many turbo chillers still have a configuration in which the impeller rotating shaft is driven via the motor shaft connected through a speed-increasing gear unit. In such configurations, a lubrication system must also be installed for the cooling and lubrication of the speed-increasing gear unit. As a result, maintenance such as changing the lubricating oil and the oil filter is unavoidable.

Recently, R1233zd(E) refrigerant has gained attention as a refrigerant. The R1233zd(E) refrigerant has a low GWP of 5 or less and a low ODP of 0.00031, and reaches negative pressure at a saturation temperature of 18° C. or lower. The R1233zd(E) refrigerant is a low-pressure refrigerant with low density used conventionally and mainly as an urethane blowing agent. As part of an effort to reduce environment impact, it is a hydrochlorofluoroolefin (HCFO) refrigerant into which research is being done involving its application to chillers.

CITATION LIST

Patent Document

Patent Document 1: Japanese Patent No. 2809346B
Patent Document 2: Japanese Unexamined Patent Application Publication No. 2013-122331A

SUMMARY OF THE INVENTION

Technical Problem

The R1233zd(E) refrigerant has gained attention as an HCFO refrigerant with low GWP due to its desirable properties of low GWP and ODP, and thus low environmental impact. However, it is a low-pressure refrigerant and has low density (approximately ⅓ of that of the R134a refrigerant). As a result, it has been considered unsuitable for use in chillers, air conditioners, and heat pumps that employ a scroll-type or rotary-type displacement compressor due to the difficulties involved in ensuring suitable performance.

Centrifugal compressors are turbo compressors with the advantage of being suited to high flow rate refrigerant compression. The present inventors, focused on whether the characteristics of the low-pressure R1233zd(E) refrigerant, which has a low density and which reaches negative pressure at a saturation temperature of 18° C. or lower, could be utilized by application to a chiller provided with a turbo compressor. As a result of diligent research, the present inventors discovered a way to provide a turbo chiller with a reduced environmental impact that utilizes the R1233zd(E) refrigerant by the R1233zd(E) refrigerant being applied to a turbo chiller provided with a turbo compressor with a specific configuration.

In light of the foregoing, an object of the present invention is to provide a turbo chiller that has an oil-free configuration, which reduces the frequency of maintenance and maintenance-induced release of refrigerant, and can achieve a reduced environmental impact by utilizing the characteristics of the low-pressure refrigerant R1233zd(E) that reaches negative pressure at a saturation temperature of 18° C. or lower.

Solution to Problem

The turbo chiller according to a first aspect of the present invention comprises a closed refrigeration cycle that includes a turbo compressor, a condenser, a decompression device, and an evaporator connected in sequence via piping and is filled with a refrigerant; wherein the refrigerant is a low-pressure refrigerant R1233zd(E) refrigerant with low global warming potential and low ozone depletion potential; the turbo compressor has a direct drive configuration in which a rotating shaft of an impeller is directly joined to a motor; and the rotating shaft is supported by a magnetic bearing.

According to this configuration, the refrigerant is a low-pressure refrigerant R1233zd(E) refrigerant with low global warming potential and low ozone depletion potential, the turbo compressor has a direct drive configuration in which the rotating shaft of the impeller is directly joined to the motor, and the rotating shaft is supported by the magnetic bearing. Thus, power loss at the speed-increasing gear unit and bearing losses of rolling bearings are reduced, allowing the turbo compressor to have higher rotation suitable for high flow rate refrigerant compression, thus compensating for inherent problems with using the R1233zd(E) refrigerant, which has been considered to have difficulties involved in ensuring suitable performance due to the low density of the low-pressure refrigerant and its high sonic velocity compared to conventional hydrofluorocarbon refrigerants. Additionally, by having an oil-free configuration without a speed-increasing gear unit or rolling bearings that require oil lubrication, the maintenance of lubrication systems such as the changing of lubricant oil and oil filters can be omitted. Thus, necessary performance can be ensured when applying the R1233zd(E) refrigerant, which is a low-pressure refrigerant with a low density. Furthermore, the turbo chiller can be provided with a reduced environmental impact due to the frequency of maintenance and maintenance-induced release of refrigerant being reduced and the characteristics of a refrigerant that reaches negative pressure at a saturation temperature of 18° C. or lower being utilized so that the refrigerant is prevented from being released into the atmosphere. Additionally, the turbo chiller has high reliability at low cost due to a simplified configuration in which the lubrication system is omitted.

The turbo chiller according to a second aspect of the present invention comprises a closed refrigeration cycle that includes a turbo compressor, a condenser, a decompression device, and an evaporator connected in sequence via piping and is filled with a refrigerant; wherein the refrigerant is a low-pressure refrigerant R1233zd(E) refrigerant with low global warming potential and low ozone depletion potential; the turbo compressor has a direct drive configuration in which a rotating shaft of an impeller is directly joined to a motor; and the rotating shaft is supported by an oil-free ceramic bearing.

According to this configuration, the refrigerant is a low-pressure refrigerant R1233zd(E) refrigerant with low global warming potential and low ozone depletion potential, the turbo compressor has a direct drive configuration in which a rotating shaft of an impeller is directly joined to a motor, and the rotating shaft is supported by the oil-free ceramic bearing. Thus, power loss at the speed-increasing gear unit and bearing losses of rolling bearings are reduced, allowing the turbo compressor to have higher rotation suitable for high flow rate refrigerant compression, thus compensating for inherent problems with using the R1233zd(E) refrigerant, which has been considered to have difficulties involved in ensuring suitable performance due to the low density of the low-pressure refrigerant and its high sonic velocity compared to conventional hydrofluorocarbon refrigerants. Additionally, by having an oil-free configuration without a speed-increasing gear unit that requires oil lubrication, the maintenance such as the changing of lubricant oil and an oil filter can be omitted. Thus, necessary performance can be ensured when applying the R1233zd(E) refrigerant, which is a low-pressure refrigerant with a low density. Furthermore, the turbo chiller can be provided with a reduced environmental impact due to the frequency of maintenance and maintenance-induced release of refrigerant being greatly reduced and the characteristics of a refrigerant that reaches negative pressure at a saturation temperature of 18° C. or lower being utilized so that the refrigerant is prevented from being released into the atmosphere. Additionally, the turbo chiller has high reliability at low cost due to a simplified configuration in which the lubrication system is omitted.

The turbo chiller according the second aspect further has a configuration wherein a liquid refrigerant from the refrigeration cycle can be circulated as a cooling and lubricating medium for at least one of a bearing housing of the bearing and an air gap of the motor.

According to this configuration, the liquid refrigerant can be circulated from the refrigeration cycle as a cooling and lubricating medium for at least one of the bearing housing of the bearing and the air gap of the motor. By cooling and lubricating the ceramic bearings with the liquid refrigerant, the durability of the bearings can be increased, and heat loss and failsafe operations due to an excessive temperature rise in the motor can be reduced by ensuring the cooling performance of the liquid refrigerant cooling the high rotation motor. This configuration successfully cools and lubricates the oil-free ceramic bearing and the motor, improving their durability and performance, thus imparts high performance and reliability to the turbo chiller.

The turbo chiller according the second aspect further has a configuration, wherein instead of the liquid refrigerant, a low-pressure gas refrigerant can be supplied to the air gap of the motor.

According to this configuration, instead of the liquid refrigerant, the low-pressure gas refrigerant can be supplied to the air gap of the motor. By supplying the low-pressure gas refrigerant as the cooling medium, agitation loss due to the motor can be reduced more than in configurations in which the liquid refrigerant is supplied. Thus, heat loss and the like can be reduced due to sufficient cooling of the motor, and agitation loss can be further reduced. As a result, motor efficiency can be increased enabling higher rotations.

The turbo chiller according to the second aspect further has a configuration, wherein a helical groove which allows the liquid refrigerant or the low-pressure gas refrigerant supplied to the air gap of the motor to flow axially outward is provided on at least one of an inner peripheral surface of a stator of the motor, an outer peripheral surface of a rotor, and an outer peripheral surface of a balance ring provided on an end surface of the rotor.

According to this configuration, the helical groove which allows the liquid refrigerant or the low-pressure gas refrigerant supplied to the air gap of the motor to flow axially outward is provided on at least one of the inner peripheral surface of the stator of the motor, the outer peripheral surface of the rotor, and the outer peripheral surface of the balance ring provided on the end surface of the rotor. Accordingly, the refrigerant supplied into the air gap can be swiftly discharged axially outward. Thus, the cooling effect of the refrigerant on the motor can be further improved, and the motor efficiency can be further increased by the reduction in windage loss of the motor due to the agitated refrigerant.

Advantageous Effects of Invention

According to the present invention, power loss at the speed-increasing gear unit and bearing losses of rolling bearings are reduced, allowing the turbo compressor to have higher rotation suitable for high flow rate refrigerant compression, thus compensating for inherent problems with using the R1233zd(E) refrigerant, which has been considered to have difficulties involved in ensuring suitable performance due to the low density of the low-pressure refrigerant and its high sonic velocity compared to conventional HFC refrigerants. Additionally, by having an oil-free configuration without a speed-increasing gear unit or rolling bearings that require oil lubrication and using oil-free ceramic bearings, the maintenance of lubrication systems such as the changing of lubricant oil and an oil filter can be omitted. Furthermore, the turbo chiller can be provided with a reduced environmental impact due to the frequency of maintenance and maintenance-induced release of refrigerant being greatly reduced and the characteristics of a refrigerant that reaches negative pressure at a saturation temperature of 18° C. or lower being utilized so that the refrigerant is prevented from being released into the atmosphere. Additionally, the turbo chiller has high reliability at low cost due to a simplified configuration in which the lubrication system is omitted.

BRIEF DESCRIPTION OF THE DRAWINGS

FIG. 5 is a schematic configuration diagram illustrating a turbo compressor according to a modified first embodiment of the present embodiment.

DESCRIPTION OF THE EMBODIMENTS

Embodiments of the present invention will be described below with reference to the attached drawings.

First Embodiment

A first embodiment of the present invention will be described below, using FIGS. 1 and 2.

Figure 1:
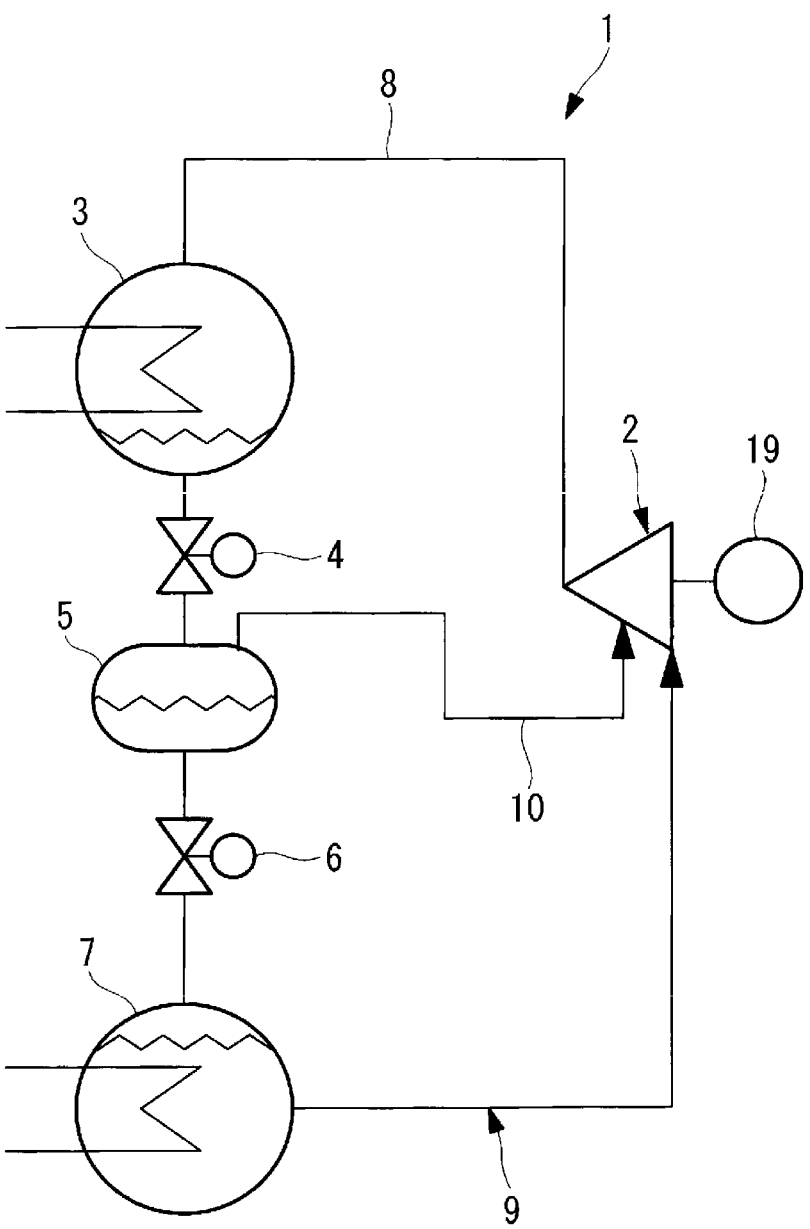
FIG. 1 is a configuration diagram illustrating a turbo chiller according to a first embodiment of the present invention.

FIG. 1 illustrates a configuration diagram of a turbo chiller according to the first embodiment. FIG. 2 illustrates a schematic configuration diagram of a turbo compressor applied to the turbo chiller.

The turbo chiller 1, as illustrated in FIG. 1, is provided with a closed refrigeration cycle 9 in which a turbo compressor 2, a condenser 3, a first decompression device 4 (decompressor), a gas-liquid separator 5 that functions as an economizer, a second decompression device 6 (decompressor), and an evaporator 7 are connected in sequence via a refrigerant pipe (piping) 8.

The refrigeration cycle 9 of the present embodiment is further provided with a known economizer circuit 10 configured to inject the gas refrigerant separated at the gas-liquid separator 5 into the intermediate pressure refrigerant compressed at a lower stage compression portion 14 of the turbo compressor 2 via an intermediate port. The economizer circuit 10 here is of a gas-liquid separation type provided with the gas-liquid separator 5. However, the economizer circuit 10 may be of an intercooler type with an intercooler for providing heat exchange between a liquid refrigerant and a portion of the refrigerant condensed and liquefied at the condenser 3 which is branched off and decompressed. Note that the economizer circuit 10 is not required in the present invention.

The refrigeration cycle 9 described above is filled with R1233zd(E) refrigerant at the necessary amount. The R1233zd(E) refrigerant has a low global warming potential (GWP) of 5 or less and a low ozone depletion potential (ODP) of 0.00031, and reaches negative pressure at a saturation temperature of 18° C. or lower. The R1233zd(E) refrigerant is a hydrochlorofluoroolefin (HCFO) refrigerant with a low GWP. The R1233zd(E) refrigerant is a low-pressure refrigerant with low density, having approximately ⅕ of the density of R134a, a hydrofluorocarbon (HFC) refrigerant used in conventional turbo chillers.

In the present embodiment, the turbo compressor 2 installed in the turbo chiller 1 filled with the R1233zd(E) refrigerant has the following configuration.

Figure 2:
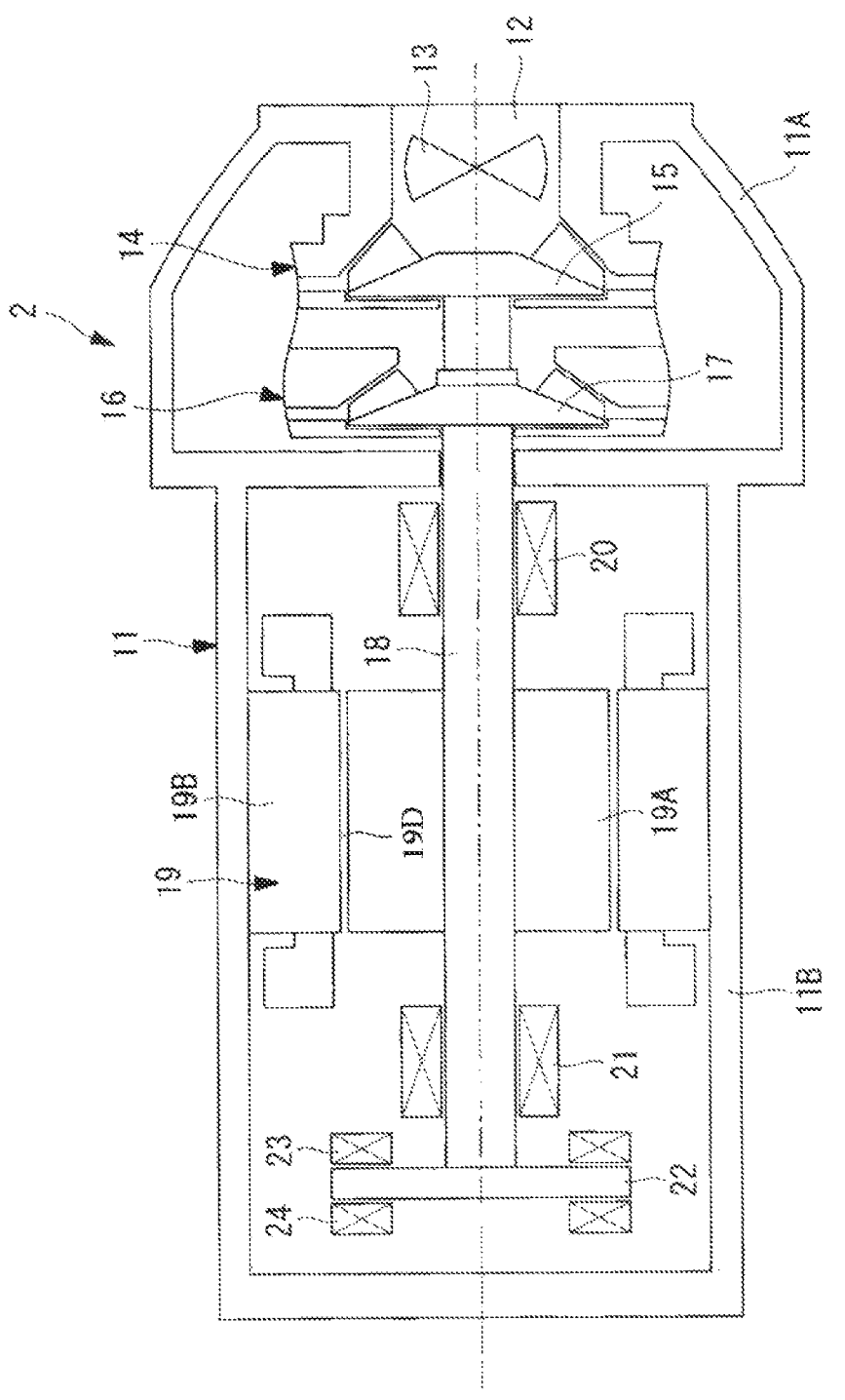
FIG. 2 is a schematic configuration diagram illustrating a turbo compressor applied to the turbo chiller.

FIG. 2 is a schematic configuration diagram of the turbo compressor 2.

The turbo compressor 2 may be a known centrifugal compressor that compresses low-pressure gas refrigerant into high-pressure gas refrigerant via a rotating impeller and circulates the high-pressure gas through the refrigeration cycle 9.

The turbo compressor 2 of the present embodiment has a direct drive configuration in which a rotating shaft 18 is directly joined to a rotor 19A of a motor 19. A lower stage and upper stage impeller 15, 17 rotate about the rotating shaft 18 driven by the motor 19. The rotating shaft 18 is supported in a manner allowing for free rotation by a pair of radial magnetic bearings 20, 21 disposed at the front and rear with respect to a housing 11 and by a pair of thrust magnetic bearings 23, 24 disposed in opposition.

In other words, the turbo compressor 2 has the following configuration. The turbo compressor 2 is provided with the housing 11, which includes a compressor housing 11A and a motor housing 11B integrated with the compressor housing 11A. The low-pressure gas refrigerant evaporated at the evaporator 7 is taken in from a refrigerant suction port 12 and passes through an inlet vane 13. Thereafter, the low-pressure gas refrigerant is compressed in two stages, at the lower stage compression portion 14 with the lower stage impeller 15 and an upper stage compression portion 16 with the upper stage impeller 17, and becomes a high-temperature high-pressure gas refrigerant. The high-temperature high-pressure gas refrigerant is discharged from a discharge port of the scroll casing to the condenser 3 outside. The intermediate pressure refrigerant gas is injected from the economizer circuit 10 between the lower stage compression portion 14 and the upper stage compression portion 16 via the intermediate port.

The lower stage impeller 15 and the upper stage impeller 17 are integrally joined to the rotating shaft 18 on the end to one side of the rotating shaft 18, separated by a predetermined interval. The rotating shaft 18 is joined to a rotor 19B of the motor 19, and thus the rotating shaft 18 of the impellers 15, 17 is directly joined to the motor 19. Additionally, the motor 19 is provided with the rotor 19A and a stator 19B, is substantially centrally disposed inside the motor housing 11B, and is configured to variably control RPM via an inverter, which is not illustrated. An air gap 19D is provided.

The rotating shaft 18 described above is supported in a manner allowing for free rotation by the pair of radial magnetic bearings 20, 21 disposed at the front and rear of the motor 19. At the rear portion, a thrust disk 22 is disposed in a fixed manner. The pair of thrust magnetic bearings 23, 24 are disposed on opposite sides of the thrust disk 22 in opposition and also support the rotating shaft 18. Note that the pair of thrust magnetic bearings 23, 24 are imparted with magnetic attraction force when current is supplied through the coil, and by centrally disposing the thrust disk 22, the thrust load received by the rotating shaft 18 is supported.

According to the configuration described above, the present embodiment has the following actions and effects.

In the turbo chiller 1 described above, by driving the turbo compressor 2, the low-pressure gas refrigerant evaporated at the evaporator 7 is taken in from the suction port 12 and passes through the inlet vane 13. The low-pressure refrigerant is centrifugally compressed in two stages at the lower stage compression portion 14 and the upper stage compression portion 16, first from low pressure to intermediate pressure, then from intermediate pressure to high pressure via the lower stage impeller 15 and the upper stage impeller 17 that are rotating at high speed. After being discharged to the scroll casing, the refrigerant is fed to the condenser 3 outside.

The refrigerant exchanges heat with a cooling medium at the condenser 3 and is condensed and liquefied. The condensed and liquefied refrigerant passes through the first decompression device 4, the gas-liquid separator 5 that functions as an economizer, and the second decompression device 6 and is subcooled and reduced to a low pressure, before being guided to the evaporator 7. The low-pressure liquid refrigerant guided to the evaporator 7 exchanges heat with a medium to be cooled, absorbs heat from the medium to be cooled thus cooling the medium to be cooled, and itself becoming vaporized. The vaporized refrigerant is then taken into the turbo compressor 2 and compressed once again, and the operation repeats.

Additionally, the economizer function of improving the cooling performance may be achieved by the liquid refrigerant that was separated at the gas-liquid separator 5, evaporated, and has subcooled the liquid refrigerant being injected into the intermediate pressure gas refrigerant compressed at the lower stage compression portion 14 from the intermediate port of the turbo compressor 2 via the economizer circuit 10.

The refrigeration cycle 9 of the turbo chiller 1 is filled with the R1233zd(E) refrigerant. The R1233zd(E) refrigerant is a low-pressure refrigerant with low density, and has low global warming potential (GWP) and low ozone depletion potential (ODP). This refrigerant has been considered to have difficulties involved in ensuring suitable performance. However, in the present embodiment, a turbo compressor 2 suitable for high flow rate refrigerant compression has a configuration in which the rotating shaft 18 of the impellers 15, 17 is directly joined to the motor 19, and the rotating shaft 18 is supported by the radial magnetic bearings 20, 21 and the thrust magnetic bearings 23, 24.

Accordingly, power loss at the speed-increasing gear unit and bearing losses of rolling bearings are reduced, allowing the turbo compressor 2 to have higher rotation suitable for high flow rate refrigerant compression, thus compensating for inherent problems with using the R1233zd(E) refrigerant, which has been considered to have difficulties involved in ensuring suitable performance due to the low density of the low-pressure refrigerant and its high sonic velocity compared to HFC refrigerants. Additionally, by having an oil-free configuration without a speed-increasing gear unit or rolling bearings that require oil lubrication, the maintenance of lubrication systems such as the changing of lubricant oil and oil filters can be omitted.

Thus, a turbo chiller 1 can be provided in which necessary performance can be ensured with the application of the R1233zd(E) refrigerant, which is a low-pressure refrigerant with low density. Additionally, the turbo chiller 1 has a reduced environmental impact due to the frequency of maintenance and maintenance-induced release of refrigerant being reduced and the characteristics of a refrigerant that reaches negative pressure at a saturation temperature of 18° C. or lower being utilized so that the refrigerant is prevented from being released into the atmosphere. Furthermore, a highly reliable turbo chiller 1 can be provided at low cost due to the simplified configuration in which a lubrication system is omitted.

Note that in the embodiment described above, an example of a turbo compressor 2 with two stage compression has been described. However, in the present invention, the turbo compressor 2 is not limited to have two stage compression and may have single stage, or three or more stage compression. In other words, it is only required that the turbo compressor 2 have a direct drive configuration in which the rotating shaft 18 of an impeller(s) is directly joined to the motor 19 and the rotating shaft 18 is supported by magnetic bearings.

Second Embodiment

Next, a second embodiment of the present invention will be described using FIGS. 3 and 4.

The present embodiment is different from the first embodiment in that the rotating shaft 18 is supported in a manner allowing free rotation by oil-free ceramic bearings 25, 26. Other points are similar to the first embodiment, so their descriptions are omitted here.

Figure 3:
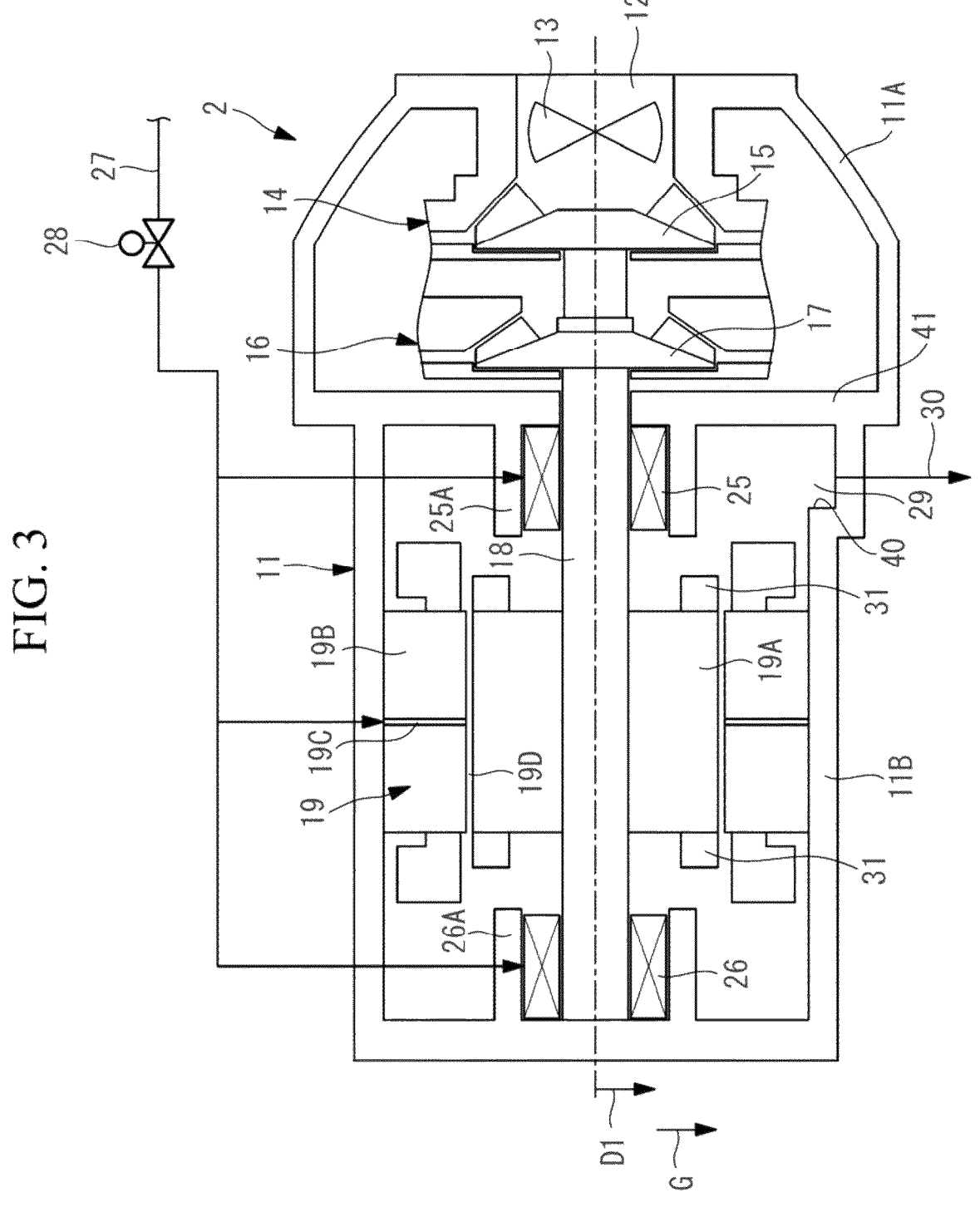
FIG. 3 is a schematic configuration diagram illustrating a turbo compressor according to a second embodiment of the present embodiment.

In the present embodiment, the rotating shaft 18 is supported in a manner allowing for free rotation by the oil-free ceramic slide bearings or rolling bearings 25, 26 (hereinafter, in the present invention, referred to as ceramic bearings) as illustrated in FIG. 3, instead of the radial magnetic bearings 20, 21 and the thrust magnetic bearings 23, 24.

The ceramic bearings 25, 26 are made from silicon nitride, have high durability, and a long lifetime despite being oil-free. In the present embodiment, the ceramic bearings 25, 26 can be cooled and lubricated by liquid refrigerant extracted from the refrigeration cycle 9. In other words, a portion of high-pressure liquid refrigerant condensed and liquefied at the condenser 3 from the refrigeration cycle 9 or a portion of low-pressure liquid refrigerant from the piping or a device between the condenser 3 and the evaporator 7 is extracted via a refrigerant extraction pipe 27. The flow rate of the extracted liquid refrigerant is adjusted at a flow rate control valve 28 and supplied to bearing housings 25A, 26A of the ceramic bearings 25, 26. As a result, the ceramic bearings 25, 26 can be cooled and lubricated by the liquid refrigerant.

In the present embodiment, in addition to the ceramic bearings 25, 26, the motor 19 can also be cooled by the liquid refrigerant described above. In such a configuration, a portion of the liquid refrigerant introduced through the refrigerant extraction pipe 27 and the flow rate control valve 28 is introduced into an air gap 19D of the motor 19 through a refrigerant introduction hole 19C provided in the stator 19B of the motor 19, enabling the rotor 19A and the stator 19B to be cooled. After cooling the ceramic bearings 25, 26 and the motor 19, the refrigerant is collected in a refrigerant sump 29 of the motor housing 11B, provided at a bottom of the compressor housing 11A, before being returned to the low-pressure region of the refrigeration cycle 9, i.e. the evaporator 7 and the like, via a refrigerant discharge pipe 30. As shown in FIG. 3, the compressor housing 11A and the motor housing 11B may be separated by a wall 41 extending in a direction perpendicular to the rotating shaft 18. The refrigerant sump 29 may include an extended wall portion (also indicated by reference numeral 29) extending from the wall 41 in a direction parallel to the rotating shaft 18, and a stepped wall portion 40 extending from the extended wall portion towards the rotating shaft 18 in a direction perpendicular to the rotating shaft 18.

Figure 4:
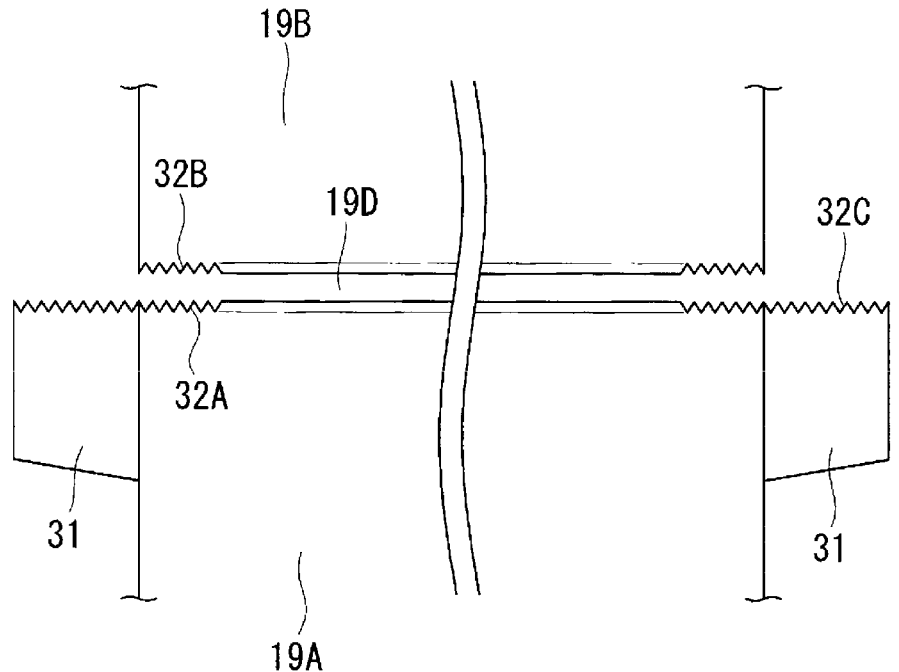
FIG. 4 is an enlarged view of a portion of a drive motor for the turbo compressor illustrated in FIG. 3.

Additionally, to reduce windage loss at the motor 19 by the swift discharge of the liquid refrigerant introduced into the air gap 19D, as illustrated in FIG. 4, helical grooves 32A,

32B, 32C, which allow the liquid refrigerant supplied into the air gap 19D to flow axially outward, are provided on at least one of the outer peripheral surface of the rotor 19A of the motor 19, the inner peripheral surface of the stator 19B, and the outer peripheral surface of a balance ring 31 provided on an end surface of the rotor 19A. Note that of the helical grooves 32A, 32B, 32C, from a machining standpoint, the helical groove 32C is most preferably provided on the outer peripheral surface of the balance ring 31.

According to this embodiment in which the rotating shaft 18 is supported by the oil-free ceramic bearings 25, 26, in a similar manner to that of the first embodiment, power loss at the speed-increasing gear unit and bearing losses of rolling bearings are reduced, allowing for the turbo compressor 2 to have higher rotation suitable for high flow rate refrigerant compression, thus compensating for inherent problems with using the R1233zd(E) refrigerant, which has been considered to have difficulties involved in ensuring suitable performance due to the low density of the low-pressure refrigerant and its high sonic velocity compared to conventional HFC refrigerants. Additionally, by having an oil-free configuration without a speed-increasing gear unit or rolling bearings that require oil lubrication, the maintenance of lubrication systems such as the changing of lubricant oil and oil filters can be omitted.

Thus, a turbo chiller 1 can be provided in which necessary performance can be ensured with the application of the R1233zd(E) refrigerant, which is a low-pressure refrigerant with low density. Additionally, the turbo chiller 1 has a reduced environmental impact due to the frequency of maintenance and maintenance-induced release of refrigerant being reduced and the characteristics of a refrigerant that reaches negative pressure at a saturation temperature of 18° C. or lower being utilized so that the refrigerant is prevented from being released into the atmosphere. Furthermore, a highly reliable turbo chiller 1 can be provided at low cost due to the simplified configuration in which a lubrication system is omitted.

Additionally, the liquid refrigerant which acts as a cooling and lubricating medium for the bearing housings 25A, 26A of the ceramic bearings 25, 26 and the air gap 19D of the motor 19 can be circulated through the refrigerant extraction pipe 27, the flow rate control valve 28, and the refrigerant discharge pipe 30 from the refrigeration cycle 9. By the ceramic bearings 25, 26 being cooled and lubricated by the liquid refrigerant, the durability of the ceramic bearings 25, 26 can be improved, and heat loss and failsafe operations can be reduced by ensuring the cooling performance of the liquid refrigerant cooling the high rotation motor 19. This configuration successfully cools and lubricates the oil-free ceramic bearings 25, 26 and the motor 19, with their improved durability and performance, which imparts high performance and reliability to the turbo chiller 1.

Furthermore, in the embodiment described above, the helical grooves 32A, 32B, 32C, which allow the liquid refrigerant supplied into the air gap 19D of the motor 19 to flow axially outward, are provided on at least one of the inner peripheral surface of the stator 19B of the motor 19, the outer peripheral surface of the rotor 19A, and the outer peripheral surface of the balance ring 31 provided on the end surface of the rotor 19A. Accordingly, the liquid refrigerant supplied into the air gap 19D can be swiftly discharged axially outward via the helical grooves 32A, 32B, 32C. Thus, the cooling effect of the liquid refrigerant on the motor 19 can be further improved, and the motor efficiency can be further increased by the reduction in windage loss of the motor 19 due to the agitated liquid refrigerant.

Additionally, in the embodiment described above, the motor 19 is cooled by introducing high-pressure liquid refrigerant or low-pressure liquid refrigerant from the refrigerant introduction hole 19C. However, instead of liquid refrigerant, low-pressure gas refrigerant formed by evaporation at the evaporator 7 may be introduced to cool the motor 19. In a configuration in which low-pressure gas refrigerant is introduced as the cooling medium for the motor 19, the agitation loss due to the motor 19 can be reduced more than in configurations in which liquid refrigerant is introduced. As a result, the motor 19 can be sufficiently cooled, thus allowing heat loss and the like to be reduced; and agitation loss can be further reduced, giving the motor 19 high efficiency, and enabling higher rotations.

Figure 5:
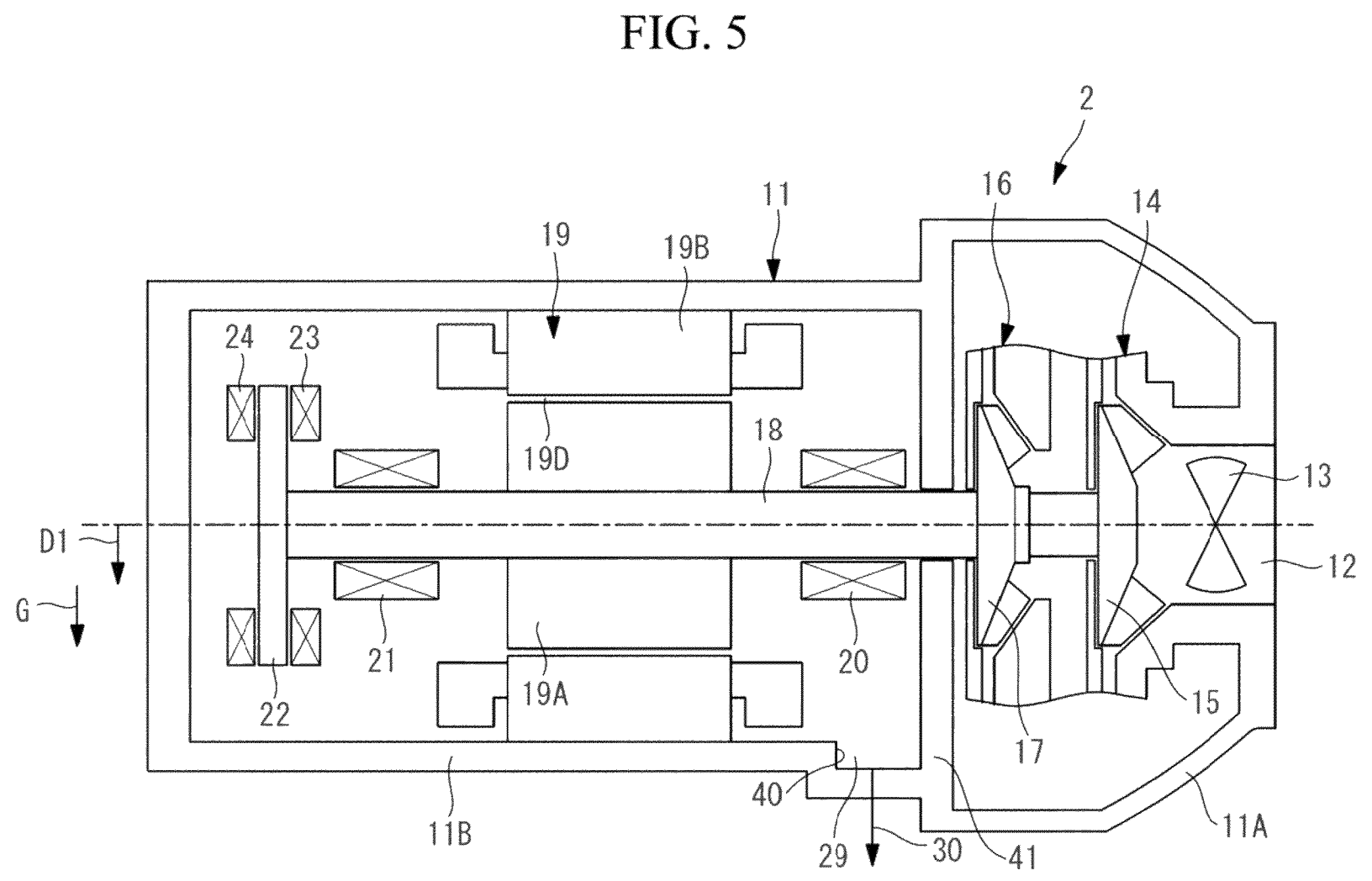

Note that the present invention is not limited to the invention according to the above-described embodiments and can be modified as required without departing from the spirit of the present invention. For example, in the embodiments described above, an example of an application of the refrigeration cycle 9 provided with the economizer circuit 10 has been described. However, a heat pump cycle of a turbo heat pump can be similarly applied. Additionally, the first embodiment may have a configuration same as that of the second embodiment in which the magnetic bearings 20, 21, 23, 24 and the motor 19 are able to be cooled by the refrigerant. Further, as shown in FIG. 5, illustrating the modified first embodiment of the present invention, the housing 11 may have a refrigerant sump 29 as shown in FIG. 2.

REFERENCE SIGNS LIST

1 Turbo chiller
2 Turbo compressor
3 Condenser
4 First decompression device
5 Gas-liquid separator
6 Second decompression device
7 Evaporator
8 Refrigerant pipe (piping)
9 Refrigeration cycle
10 Economizer circuit
11 Housing
11A Compressor housing
11B Motor housing
12 Refrigerant suction port
12 Inlet vane
14 Lower stage compression portion
15 Lower stage impeller
16 Upper stage compression portion
17 Upper stage impeller
18 Rotating shaft
19 Motor
19A Rotor
19B Stator
19C Refrigerant introduction hole
19D Air gap
20, 21 Radial magnetic bearing
22 Thrust disk
23, 24 Thrust magnetic bearing
25, 26 Ceramic bearing
25A, 26A Bearing housing
27 Refrigerant extraction pipe
28 Flow rate control valve
29 Extended portion; Refrigerant sump
30 Refrigerant discharge pipe
31 Balance ring

32A, 32B, 32C Helical groove
40: Stepped portion
41: Wall
D1: Direction perpendicular to rotating shaft
G: Gravity direction

The invention claimed is:

1. A turbo chiller comprising:

a closed refrigeration cycle that includes a turbo compressor, a condenser, a decompression device, and an evaporator connected in sequence via piping and is filled with a refrigerant; wherein the refrigerant is a R1233zd(E) refrigerant;

the turbo compressor has a direct drive configuration in which a rotating shaft of an impeller is directly joined to a motor;

the turbo compressor is provided with a housing that includes a compressor housing and a motor housing integrated with the compressor housing, and that includes a wall, extending in a direction perpendicular to the rotating shaft, separating the compressor housing and the motor housing;

the motor is disposed inside the motor housing;

the motor housing includes a refrigerant sump that increases an internal space of the motor housing in the direction perpendicular to the rotating shaft;

the refrigerant sump is provided only at a position that does not overlap with the motor as seen from the direction perpendicular to the rotating shaft; and the rotating shaft is supported by a magnetic bearing, wherein the wall that separates the compressor housing and the motor housing has no opening that allows a gas refrigerant to flow from the compressor housing to the motor housing, and the motor housing is connected to a refrigerant extraction pipe that provides only a liquid refrigerant for cooling the motor.

2. The turbo chiller according to claim 1, wherein the refrigerant sump increases the internal space of the motor housing in a gravity direction.

3. The turbo chiller according to claim 1, wherein the refrigerant sump is disposed between the motor and the impeller as seen from the direction perpendicular to the rotating shaft.

4. The turbo chiller according to claim 1, wherein the refrigerant sump is connected with a refrigerant discharge pipe.

5. A turbo chiller comprising:

a closed refrigeration cycle that includes a turbo compressor, a condenser, a decompression device, and an evaporator connected in sequence via piping and is filled with a refrigerant; wherein the refrigerant is a R1233zd(E) refrigerant;

the turbo compressor has a direct drive configuration in which a rotating shaft of an impeller is directly joined to a motor;

the turbo compressor is provided with a housing that includes a compressor housing and a motor housing integrated with the compressor housing, and that includes a wall, extending in a direction perpendicular to the rotating shaft, separating the compressor housing and the motor housing;

the motor is disposed inside the motor housing;

the motor housing includes a refrigerant sump provided at a bottom of the motor housing to collect the refrigerant, the refrigerant sump including an extended wall portion extending from the wall in a direction parallel to the rotating shaft, and a stepped wall portion extending from the extended wall portion in the direction perpendicular to the rotating shaft, the refrigerant sump being configured to increase an internal space of the motor housing at the bottom of the motor housing;

the stepped portion is provided only at a position that does not overlap the motor as seen from the direction perpendicular to the rotating shaft;

the refrigerant sump is configured to store liquid, and the rotating shaft is supported by a magnetic bearing, wherein the wall that separates the compressor housing and the motor housing has no opening that allows a gas refrigerant to flow from the compressor housing to the motor housing, and the motor housing is connected to a refrigerant extraction pipe that provides only a liquid refrigerant for cooling the motor.

6. The turbo chiller according to claim 5, wherein the extended wall portion is disposed between the motor and the impeller as seen from the direction perpendicular to the rotating shaft.

7. The turbo chiller according to claim 5, wherein the extended wall portion increases the internal space of the motor housing in a gravity direction.

8. The turbo chiller according to claim 5, wherein the extended wall portion is connected with a refrigerant discharge pipe.

* * * * *